Jan. 14, 1964 R. P. HOSEK 3,117,633
LAWN TREATING MACHINES
Filed April 15, 1960
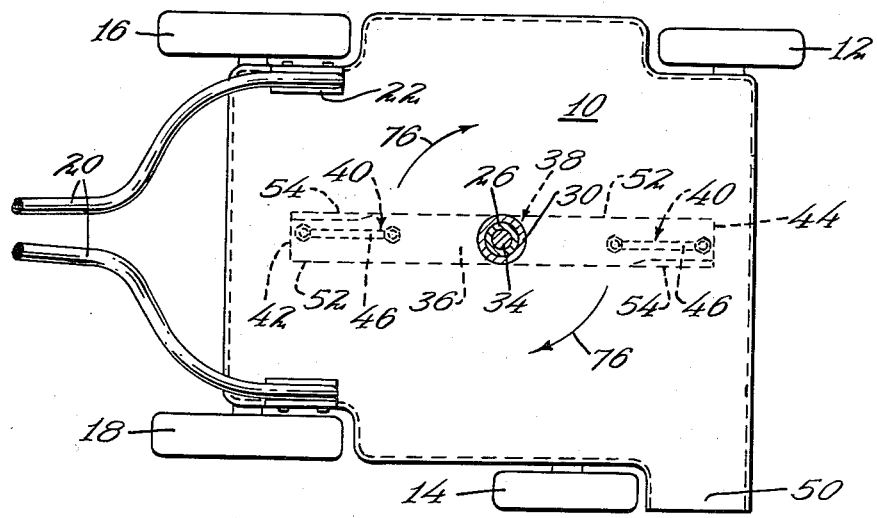
FIG. 1
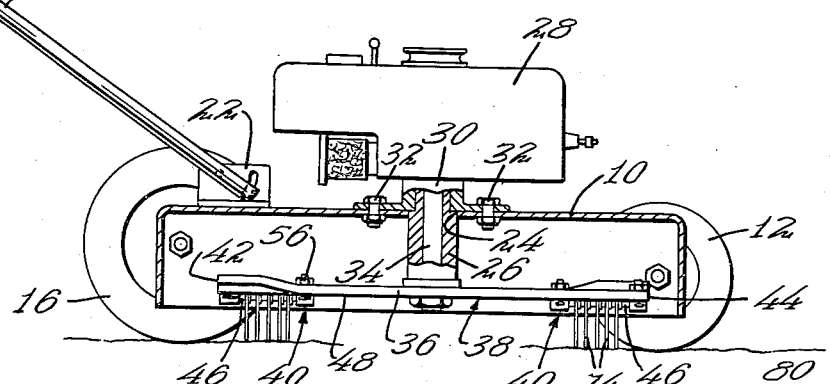
FIG. 2
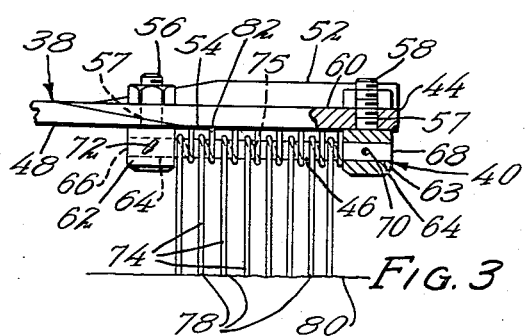
FIG. 3
FIG. 4
INVENTOR
Robert P. Hosek
BY Robert M. Dunning
ATTORNEY 3,117,633
LAWN TREATING MACHINES
Robert P. Hosek, 1292 N. Shore Drive, Lake Elmo, Minn.
Filed Apr. 15, 1960, Ser. No. 22,559
6 Claims. (Cl. 172—42)

This invention relates to lawn treating machines and deals particularly with an attachment for use on rotary type lawn mower for the mulching of ground surface or lawns which are to be reseeded.

It is considered advantageous when re-seeding a lawn that the existing grass, leaves, and the like be returned to the soil as mulch and to be mixed with the soil prior to seeding. This operation normally requires a special machine although the result may be accomplished by a hand rake. It is the primary object of this invention to provide a mulching attachment which may be applied to existing rotary type lawn mowers or incorporated as an optional original equipment thereon.

A feature of the present invention resides in the provision of a mulching attachment which may be readily attached or removed from a lawn mower at the desire of the operator.

Another feature of the present invention resides in the provision of a mulching attachment in which the ground engaging means employed may be readily and inexpensively replaced when they become excessively worn.

Other objects and novel features will become apparent from the following description taken in connection with the drawings wherein:

FIGURE 1 is a plan view of the lower housing of a lawn mower with my new attachment shown mounted therein.

FIGURE 2 is a side elevational view partly in section of a lawn mower showing my new invention mounted thereon.

FIGURE 3 is an enlarged view of the forward or cutting edge of a blade showing the position of my invention relative to the cutting blade.

FIGURE 4 is an enlarged end elevation of a cutting blade showing my new invention mounted thereon.

The lawn mower shown in the drawings is for purposes of illustration only since this invention may be applied to practically any mower utilizing a rotary type sickle or blade.

The particular lawn mower chosen to illustrate my invention comprises a housing 10 having an open lower end and supported on a pair of forward wheels 12 and 14 and rear wheels 16 and 18. The housing is provided near its rear top surface with a guide handle 20 which is mounted in brackets 22 on the top of the housing. The top of the housing 10 is apertured at 24 to receive the downwardly extending drive shaft bearing tube 26 of a conventional engine 28. The engine is mounted on a bearing flange 30 which is secured by bolts 32 to the top surface of the housing 10. The drive shaft 34 extends downwardly within the tube 26 and is connected to the cross arm 36 of the cutting blade 38.

As is most clearly seen in FIGURE 2 of the drawings, each mulching assembly 40 is mounted on one of the outer opposite ends 42 and 44 of the rotary cutting blade 38. The assembly in each case includes an elongated shaft or pivot member 46 which is suspended on the underside 48 of the cutting blade.

As best seen in FIGURES 3 and 4 the ends 42 and 44 of the cutting blade are bent so as to effect air currents which are directed outwardly of the housing 10 through the opening 50. The trailing edge 52 of the blade ends 42 and 44 lie in a plane above the level of the lead cutting edges 54. The above paragraph has described the conventional cutting blades used on rotary lawn mowers. However, the specific type of blade described is not essential to the operation of my invention since no air current is needed to complete a mulching operation. Conversely the presence of the air current caused by the rotating blade does not decrease or hinder the effectiveness of the mulching process.

As heretofore stated each pivot member or shaft 46 is connected to a corresponding one of the opposite ends of the cutting blade. The means for supporting the shafts beneath the blade ends includes bolts 56 and 58 which extend upwardly through apertures 57 disposed in the flat surface 60 adjacent the cutting edge 54. The bolts are provided with enlarged heads 62 and 63 which in turn are bored as at 64 to provide apertures substantially the same diameter size as that of the shafts 46. The bores are aligned longitudinally and the ends 66 and 68 of the shaft 46 disposed therein. A second pair of apertures 70 extend through the heads 62 and 63 intersecting the bores 64 at substantially right angles. The apertures 70 are aligned with apertures through the shafts 46 and serve to accommodate cotter keys 72 or the like which hold the shafts 46 in place.

The mulching or ground engaging means includes a series of torsion springs 74 which include intermediate helical portions 75 which encircle the shafts 46 as best seen in FIGURES 3 and 4. When the lower is not in use the springs 74 have a tendency to hang loosely on the shafts; however, the ends of the springs are so disposed that when the blade is rotating in the direction indicated by the arrows 76, the ground engaging ends 78 of the springs 74 will be held firmly against the ground surface 80 and at a slight obtuse angle relative to the ground surface as seen in FIGURE 4. The free ends 82 of the springs 74 bear against the under surface 48 of the blade ends 42 and 44. Rocks, stones, or other debris which may be encountered in the ground during a mulching operation will flex the springs to some degree thus minimizing excessive wear on the springs. However, the shafts may be readily removed from the bolt heads so that damaged springs might be quickly replaced.

The mulching assemblies might be packaged in a kit and marketed separately for application to existing mower equipment. The only thing necessary to adapt existing cutter blades for use with my invention is the presence of the apertures 57 disposed through the blade at the proper intervals.

In accordance with the patent statutes, I have described the principles of construction and operation of my improvement in lawn treating machines, and while I have endeavored to set forth the best embodiment thereof, I desire to have it understood that changes may be made within the scope of the following claims without departing from the spirit of my invention.

I claim:

1. An attachment for use with a mower comprising a wheeled housing having an open lower end, a prime mover thereon and provided with an elongated cutting blade support on and rotatable on a generally vertical axis in said housing, said attachment comprising a pair of shafts, nut and bolt means for supporting said shafts beneath said cutting blade parallel to said blade and on opposite sides of the blade axis, enlarged heads on said bolts, the ends of said shafts extending through apertures in said bolt heads and being keyed transversely through said bolt heads and said shaft ends, a plurality of torsion springs having coiled intermediate portions loosely supported on said shaft members, said springs having one end depending downwardly to engage the ground at an obtuse angle relative to said ground when said blade is rotating to provide a mulching action, and another free end extending rearwardly of said shaft members to bear against the undersurface of said cutting blade.

2. In combination, a hollow chamber having an open lower end, an upright driven power shaft journaled and supported therein, a cutting blade rotatably supported on said shaft within said chamber, a mulching attachment comprising a pair of shaft members, nut and bolt means supporting said shafts on the opposite outer ends of said cutting blade, said shafts being supported on the under surface of said blade in parallel relation thereto, the ends of said shafts extending through apertures in said bolts and being keyed transversely through said shaft ends and said bolts, a plurality of torsion springs loosely supported on said shaft members, said spring having one end inclined downwardly to engage the ground surface at an obtuse angle relative to said ground surface when said blade is rotating to provide a mulching action, and another free end on said torsion springs extending rearwardly to bear against the under surface of said cutting blade.

3. An attachment for a mower including:
   (a) a housing
   (b) a prime mover mounted thereon and provided with an elongated blade rotatable on a generally vertical axis beneath a portion of said housing,
   (c) the attachment including a pair of shafts in fixed, longitudinally spaced apart, axial alignment,
   (d) each said shaft having means securing the said shaft independently of said other shaft beneath said blade,
   (e) a series of mulching fingers on each shaft in axially spaced relation,
   (f) each of said fingers including coiled intermediate portions encircling one of said shafts,
   (g) an end depending downwardly to engage the ground, and
   (h) an end extending rearwardly from said shaft in the direction of rotoation of said blade to bear against the blade to hold each finger from rotation about the shaft on which it is mounted,
   (i) whereby said fingers cooperate with said blade to provide a mulching action to mulch the grass mowed by said blade.

4. The structure of claim 3 and in which the downwardly depending end of each finger extends forwardly of its shaft in the direction of rotation of said blade.

5. The structure of claim 3 and in which said means securing said shafts includes a pair of shaft engaging members at opposite ends of said shaft.

6. An attachment for a mower including:
   (a) a housing
   (b) a prime mover mounted thereon and provided with an elongated blade rotatable on a generally vertical axis beneath a portion of said housing,
   (c) the attachment including a pair of shafts,
   (d) means including a pair of shaft engaging members at opposite ends of said shaft securing said shafts beneath said blade and generally parallel thereto on opposite sides of said vertical axis,
   (e) said shaft engaging members including threaded studs extending through said blade, and nuts for holding said studs in position,
   (f) a series of mulching fingers on each said shaft in axially spaced relation,
   (g) each of said fingers including coiled intermediate portions encircling one of said shafts,
   (h) an end depending downwardly to engage the ground,
   (i) said downwardly depending end of each finger extending forwardly of its shaft in the direction of rotation of said blade, and
   (j) an end extending rearwardly from said shaft in the direction of rotation of said blade to bear against the blade to hold each said finger from rotation about the shaft on which it is mounted.

References Cited in the file of this patent

UNITED STATES PATENTS

| | | |
|---|---|---|
| 333,917 | Brown | Jan. 5, 1886 |
| 740,769 | Lincoln | Oct. 6, 1903 |
| 2,863,162 | Draughon | Dec. 9, 1958 |
| 2,871,958 | Zacharias | Feb. 3, 1959 |

FOREIGN PATENTS

| | | |
|---|---|---|
| 450,535 | Great Britain | July 21, 1936 |